(12) United States Patent
Ishii et al.

(10) Patent No.: US 8,913,930 B2
(45) Date of Patent: Dec. 16, 2014

(54) DEVELOPING ROLLER, ELECTROPHOTOGRAPHIC PROCESS CARTRIDGE, AND ELECTROPHOTOGRAPHIC IMAGE FORMING APPARATUS

(75) Inventors: Toru Ishii, Numazu (JP); Masaki Yamada, Mishima (JP); Genya Anan, Numazu (JP)

(73) Assignee: Canon Kabushiki Kaisha, Tokyo (JP)

( * ) Notice: Subject to any disclaimer, the term of this patent is extended or adjusted under 35 U.S.C. 154(b) by 355 days.

(21) Appl. No.: 13/526,457

(22) Filed: Jun. 18, 2012

(65) Prior Publication Data

US 2013/0004211 A1   Jan. 3, 2013

(30) Foreign Application Priority Data

Jun. 29, 2011   (JP) .................................. 2011-144245

(51) Int. Cl.
  *G03G 15/08*   (2006.01)
  *B32B 9/04*   (2006.01)
  *B32B 11/04*   (2006.01)
  *B32B 27/18*   (2006.01)

(52) U.S. Cl.
  CPC .............. *G03G 15/0818* (2013.01); *B32B 9/04* (2013.01); *B32B 11/044* (2013.01); *B32B 27/18* (2013.01); *B32B 2457/00* (2013.01)
  USPC ........................................................ 399/286

(58) Field of Classification Search
  CPC ...... G03G 15/0818; B32B 9/04; B32B 27/18; B32B 11/044; B32B 2457/00
  USPC ............. 399/286; 428/425.5, 447; 430/123.3; 492/59
  See application file for complete search history.

(56) References Cited

U.S. PATENT DOCUMENTS 7,797,833 B2   9/2010   Nakamura et al.
7,799,398 B2   9/2010   Nakamura et al.

(Continued)

FOREIGN PATENT DOCUMENTS

JP   3-192377 A   8/1991
JP   2010-170105 A   8/2010

*Primary Examiner* — Billy Lactaoen
(74) *Attorney, Agent, or Firm* — Fitzpatrick, Cella, Harper and Scinto

(57) ABSTRACT

Provided is the following developer carrying member. The member has high charge-providing performance even under a high-temperature, high-humidity environment, and its surface layer hardly peels off its elastic layer even after long-term standing under the high-temperature, high-humidity environment. The developer carrying member comprises a mandrel, an elastic layer including a silicone rubber, and a surface layer covering a surface of the elastic layer, and the surface layer comprises a binder resin, and a copolymer having structural units of formula (1) and formula (2). R1 represents an alkyl group having 10-18 carbon atoms, R2 represents a methyl group or a hydrogen atom, R3 represents an alkylene group having 1-4 carbon atoms, X⁻ represents a chloride ion, a bromide ion, or a p-toluenesulfonic acid ion, R4 represents a methyl group or a hydrogen atom, and R5 represents an alkylene group having 1-4 carbon atoms.

12 Claims, 2 Drawing Sheets

(56) References Cited

U.S. PATENT DOCUMENTS

| | | |
|---|---|---|
| 7,947,339 B2 | 5/2011 | Yamauchi et al. |
| 2009/0060597 A1* | 3/2009 | Yoshida et al. ............... 399/286 |
| 2010/0202801 A1* | 8/2010 | Otake et al. ................... 399/252 |
| 2011/0091240 A1 | 4/2011 | Anan et al. |
| 2012/0195631 A1 | 8/2012 | Yamada et al. |

* cited by examiner

DEVELOPING ROLLER, ELECTROPHOTOGRAPHIC PROCESS CARTRIDGE, AND ELECTROPHOTOGRAPHIC IMAGE FORMING APPARATUS

BACKGROUND OF THE INVENTION

1. Field of the Invention

The present invention relates to a developing roller to be incorporated into an apparatus adopting an electrophotographic mode such as a copying machine, a printer, or a receiving apparatus of a facsimile, to an electrophotographic process cartridge, and to an electrophotographic image forming apparatus.

2. Description of the Related Art

In a copying machine, facsimile, or printer employing an electrophotographic mode, a photosensitive member is charged by charging unit and then an electrostatic latent image is formed on the photosensitive member by laser. Next, a developer in a developer container is conveyed by a developer carrying member, and then the electrostatic latent image on the photosensitive member is developed with the developer at a portion where the photosensitive member and the developer carrying member are close to each other.

After that, the developer on the photosensitive member is transferred onto recording paper by transferring unit, and is then fixed by heat and a pressure. A developing roller of such a construction that an elastic layer is provided on the periphery of a metal mandrel and one or more surface layers are formed thereon as required, or a developing sleeve free of any elastic layer has been used as the developer carrying member. Particularly in an electrophotographic apparatus according to a non-magnetic, one-component contact development mode, the developing roller having the elastic layer has been suitably used, and a silicone rubber excellent in deformation recoverability and softness has been widely used as a constituent material for the elastic layer.

Such developer carrying member serves to provide charge for the developer through triboelectric charging as well as to convey the developer. The charged state of the developer largely affects the image quality and stability of an electrophotographic image. Accordingly, the developer carrying member has been demanded to be capable of controlling the charged state of the developer to a proper one. In particular, an insufficient charge quantity of the developer is responsible for the occurrence of, for example, fogging in the electrophotographic image. Accordingly, the developer carrying member has been demanded to improve its triboelectric charge-providing performance for the developer.

Japanese Patent Application Laid-Open No. H03-192377 discloses a method involving adding a copolymer containing a quaternary ammonium base to the surface layer of a developing roller for improving its charge-providing performance for a negatively chargeable developer.

In addition, Japanese Patent Application Laid-Open No. 2010-170105 discloses a method involving adding a copolymer containing a quaternary ammonium base to the surface layer of a developing sleeve for improving its charge-providing performance for a negatively chargeable developer.

By the way, the triboelectric charge quantity of a developer tends to reduce as the temperature or humidity of an environment surrounding the developer increases. Meanwhile, the variety of environments where an electrophotographic image forming apparatus is used has started to increase extremely. In view of the foregoing, the inventors of the present invention have acknowledged that a developer carrying member capable of stably charging a developer even under a high-temperature, high-humidity environment, specifically, for example, an environment having a temperature of 40° C. and a relative humidity of 90% is needed.

Under such acknowledgement, the inventors of the present invention have conducted an investigation on the addition of such copolymer containing a quaternary ammonium base as described in each of Japanese Patent Application Laid-Open No. H03-192377 and Japanese Patent Application Laid-Open No. 2010-170105 listed above to the surface layer of a developer carrying member having a silicone rubber elastic layer.

As a result, the inventors have confirmed that the developer carrying member shows good charge-providing performance for a negatively chargeable developer even under a high-temperature, high-humidity environment. However, when the member is stored under the high-temperature, high-humidity environment for a long time period, adhesiveness between the surface layer and the silicone rubber elastic layer reduces, and hence the surface layer peels off the silicone rubber elastic layer in some cases.

That is, the inventors have acknowledged that high adhesiveness for the silicone rubber elastic layer as well as high charge-providing performance is needed for the surface layer of the developer carrying member using the silicone rubber elastic layer.

SUMMARY OF THE INVENTION

In view of the foregoing, the present invention is directed to providing the following high-quality developing roller. Even when the roller is used under various environments, the roller has excellent charge-providing performance for a developer and its surface layer hardly peels off its elastic layer containing a silicone rubber.

The present invention is also directed to providing an electrophotographic apparatus capable of stably outputting high-quality electrophotographic images and a process cartridge to be used in the apparatus.

The inventors of the present invention have made extensive studies and investigations to provide a developer carrying member that serves the object, and as a result, have reached the present invention.

That is, according to one aspect of the present invention, there is provided a developer carrying member, comprising: a mandrel; an elastic layer including a silicone rubber; and a surface layer covering a peripheral surface of the elastic layer, wherein the surface layer comprises: a binder resin; and a copolymer having a structural unit represented by the following structural formula (1) and a structural unit represented by the following structural formula (2).

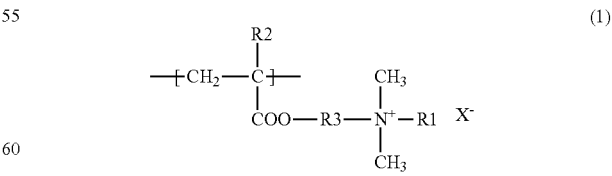

(1)

In the structural formula (1), R1 represents an alkyl group having 10 to 18 carbon atoms, R2 represents one of a methyl group and a hydrogen atom, R3 represents an alkylene group having 1 to 4 carbon atoms, and X⁻ represents one of a chloride ion, a bromide ion, and a p-toluenesulfonic acid ion.

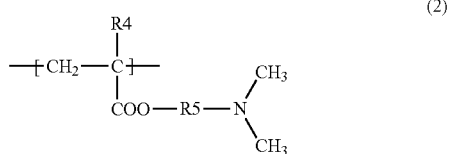

(2)

In the structural formula (2), R4 represents one of a methyl group and a hydrogen atom and R5 represents an alkylene group having 1 to 4 carbon atoms.

According to another aspect of the present invention, there is provided an electrophotographic process cartridge and an electrophotographic image forming apparatus each comprising the above-described developing roller.

According to the present invention, the following high-quality developing roller is obtained. The roller has good charge-providing performance under a high-temperature, high-humidity environment, and the peeling of its surface layer from its silicone rubber elastic layer during its long-term storage under the high-temperature, high-humidity environment is suppressed. In addition, the use of the developing roller provides a high-quality electrophotographic process cartridge and a high-quality electrophotographic image forming apparatus.

Further features of the present invention will become apparent from the following description of exemplary embodiments with reference to the attached drawings.

DESCRIPTION OF THE EMBODIMENTS

Hereinafter, the present invention is described by taking a developer carrying member 1 having a roller shape (hereinafter, sometimes referred to as "developing roller") as an example, provided that the present invention is not limited to the developing roller and is applicable to a developer carrying member having, for example, an endless belt shape.

Figure 1:
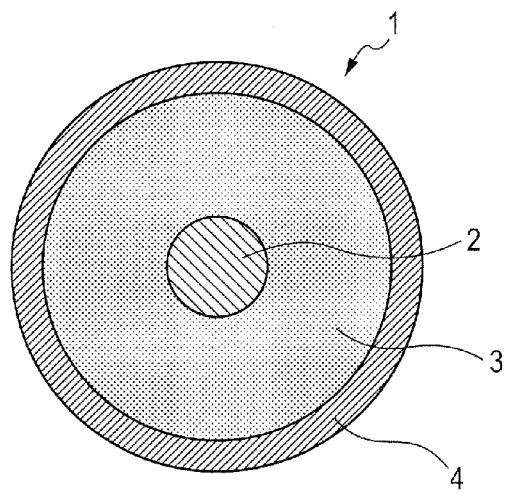
FIG. 1 is a conceptual view illustrating an example of the sectional structure of a developing roller according to the present invention.

FIG. 1 is a sectional view in a section in a direction perpendicular to the rotation axis of the developing roller according to the present invention, and the developing roller has a columnar or hollow cylindrical mandrel 2, an elastic layer 3 containing a silicone rubber formed on the outer peripheral surface thereof, and a surface layer 4 covering the peripheral surface of the elastic layer.

(Mandrel)

The mandrel functions as an electrode and supporting member of the developer carrying member, and is constituted of a conducting material such as: a metal or an alloy such as aluminum, a copper alloy, or stainless steel; iron subjected to a plating treatment with chromium or nickel; or a synthetic resin having conductivity.

(Elastic Layer)

The elastic layer is characterized by containing the silicone rubber. The elastic layer imparts, to the developing roller, such hardness and elasticity that the roller is pressed against a photosensitive member with a proper nip width and a proper nip pressure so that an electrostatic latent image formed on the surface of the photosensitive member can be supplied with a proper quantity of a developer. The elastic layer is preferably formed of a molded body of a rubber material in ordinary cases, and the silicone rubber is particularly suitably used as the rubber material because the silicone rubber is excellent in deformation recoverability and softness. Examples of the silicone rubber include copolymers such as a polydimethylsiloxane, a polymethylvinylsiloxane, a polymethoxymethylsiloxane, and a polyethoxymethylsiloxane.

The conductivity of the elastic layer can be appropriately adjusted by blending an electrical conductivity-imparting agent such as an electron conducting substance or an ionic conducting substance into the elastic layer. Carbon black, and metal and metal oxide such as copper, silver, aluminum, and germanium can each be used as the electron conducting substance. Of those, carbon black is particularly preferred because a relatively small addition amount thereof provides good conductivity. In addition, examples of the ionic conducting substance include: inorganic ionic conducting substances such as sodium perchlorate, lithium perchlorate, calcium perchlorate, and lithium chloride; and organic ionic conducting substances such as modified aliphatic dimethylammonium ethosulfate and stearylammonium acetate. When such carbon black as described above is used as the electrical conductivity-imparting agent, the carbon black is blended in an amount of 5 to 20 parts by mass with respect to 100 parts by mass of the rubber in the rubber material.

Various additives such as a non-conducting filler, a crosslinking agent, and a catalyst as well as the electrical conductivity-imparting agent are appropriately blended into the elastic layer. Examples of the non-conducting filler include silica, quartz powder, titanium oxide, and zinc oxide. Examples of the crosslinking agent include di-t-butyl peroxide, 2,5-dimethyl-2,5-di(t-butylperoxy)hexane, and dicumyl peroxide.

The elastic layer has a thickness in the range of preferably 2.0 to 6.0 mm, more preferably 3.0 to 5.0 mm.

(Surface Layer)

The surface layer is characterized by containing a binder resin, and a copolymer having a structural unit represented by the following structural formula (1) and a structural unit represented by the following structural formula (2).

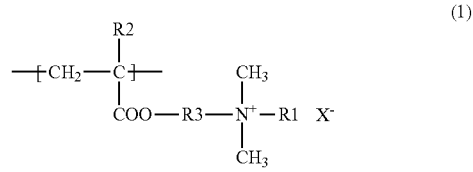

(1)

In the structural formula (1), R1 represents an alkyl group having 10 to 18 carbon atoms, R2 represents one of a methyl group and a hydrogen atom, R3 represents an alkylene group having 1 to 4 carbon atoms, and X⁻ represents one of a chloride ion, a bromide ion, and a p-toluenesulfonic acid ion.

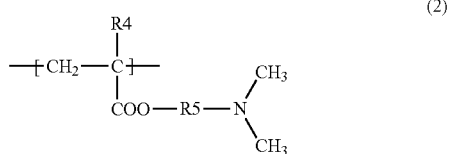
(2)

In the structural formula (2), R4 represents one of a methyl group and a hydrogen atom and R5 represents an alkylene group having 1 to 4 carbon atoms.

The structural formula (1) is a structural unit containing a quaternary ammonium base and is considered to function as a component that serves mainly to provide the developer with charge. The developer carrying member has a function of charging the developer through the rubbing of the surface of the developer carrying member and the developer. Accordingly, the triboelectric chargeability of the surface of the developer carrying member largely affects the charge-providing performance of the developer carrying member for the developer.

When two different materials are rubbed together, one material is positively charged and the other material is negatively charged in ordinary cases. That is, when one wishes to improve the charge-providing performance of the developer carrying member for a negatively chargeable developer, it may be desired that a positively chargeable component exist on the surface of the developer carrying member.

A material containing a quaternary ammonium base has such a tendency as to be positively charged with ease, and hence has been widely used as a charge control agent for a positively chargeable developer. In addition, the quaternary ammonium base has large polarity because the base is an ionic functional group, and hence strongly tends to be oriented toward the inside of the material rather than an interface with a gas phase in ordinary cases. However, in the structural formula (1) which the copolymer of the present invention has, the quaternary ammonium base has the alkyl group having 10 to 18 carbon atoms as a substituent, and hence the quaternary ammonium base is easily oriented toward the interface with the gas phase due to the hydrophobicity of the alkyl group. Accordingly, it is assumed that the structural unit represented by the structural formula (1) can exist on the outermost surface of the developing roller and hence can effectively provide the developer with charge. In particular, when the number of carbon atoms of the alkyl group is 14 or more, the orientation due to the hydrophobicity becomes significant and hence the developer can be provided with additionally large charge.

On the other hand, the alkyl group having 10 to carbon atoms which the structural formula (1) has is easily oriented toward an interface with the silicone rubber elastic layer by an interaction with the silicone rubber showing hydrophobicity. When such oriented state is formed, an interfacial state between the surface layer and the silicone rubber elastic layer is destabilized by a high degree of freedom of movement which the alkyl group has. As a result, such a tendency that adhesion between the surface layer and the elastic layer is inhibited may increase. By such reason as described above, it is assumed that the peeling of the surface layer is apt to occur when a copolymer containing a quaternary ammonium base, in particular, a copolymer containing a quaternary ammonium base having an alkyl group having 10 to 18 carbon atoms is added to the surface layer on the silicone elastic layer.

In the present invention, the copolymer having the structural unit represented by the structural formula (1) and the structural unit represented by the structural formula (2) is incorporated into the elastic layer for suppressing the peeling of the surface layer resulting from the structural unit represented by the structural formula (1).

That is, the structural formula (2) is a structural unit containing a dimethylamino group and is considered to be a component that serves mainly to suppress the peeling of the surface layer due to improving adhesiveness with the silicone rubber elastic layer. Although a detailed reason why the structural unit represented by the structural formula (2) is responsible for the adhesiveness with the silicone rubber elastic layer is unclear, the reason is assumed to be as described below.

In ordinary cases, the silicone rubber has a methyl group bonded to a silicon atom and has such a helical structure that the methyl group is directed outward. Accordingly, the methyl group bonded to the silicon atom is oriented toward the surface of the elastic layer containing the silicone rubber. At this time, between the silicon atom and the carbon atom of the methyl group of the silicone rubber, a dipole moment in a direction from the carbon atom toward the silicon atom (hereinafter, sometimes referred to as "first dipole moment") occurs based on a difference in electronegativity between the respective elements.

In addition, in the dimethylamino group in the structural unit represented by the structural formula (2), based on a difference in electronegativity between the nitrogen atom and the carbon atom of a methyl group, a dipole moment in a direction from the nitrogen atom toward the carbon atom (hereinafter, sometimes referred to as "second dipole moment") occurs.

As a result, at the interface between the elastic layer and surface layer of the developer carrying member according to the present invention, a dipole-dipole interaction may occur between the first dipole moment and the second dipole moment. That is, the surface layer and the elastic layer according to the present invention are assumed to show high adhesiveness because attraction based on the dipole-dipole interaction occurs between the surface layer and the elastic layer.

As described above, according to the present invention, the following developer carrying member can be obtained by incorporating, into the surface layer covering the surface of the elastic layer containing a silicone rubber having a methyl group bonded to a silicon atom, the copolymer obtained by incorporating, into the same molecule, the structural unit represented by the structural formula (1) and the structural unit represented by the structural formula (2). The developer carrying member shows high charge-providing performance and the peeling of the surface layer from the elastic layer is effectively suppressed.

By the way, when the surface layer is formed by using a mixture of a copolymer containing the structural unit represented by the structural formula (1) (referred to as "copolymer a") and a copolymer containing the structural unit represented by the structural formula (2) (referred to as "copolymer b"), the latter copolymer (copolymer b) having relatively small polarity is preferentially oriented toward the interface between the elastic layer and the surface layer, and toward the interface with the gas phase. As a result, the former copolymer (copolymer a) exists somewhat inward from both the interfaces and hence a charge-providing effect cannot be expressed due to the structural unit represented by the structural formula (1) in some cases.

For the copolymer according to the present invention having, in the same molecule, the structural unit represented by the structural formula (1) and the structural unit represented by the structural formula (2), both portions of the structural units represented by the structural formula (1) and the structural formula (2) can exist near the interfaces. As a result, compatibility between high charge-providing performance and the suppression of the peeling of the surface layer is assumed to be achieved.

The case where each of R2 in the structural formula (1) and R4 in the structural formula (2) represents a hydrogen atom is preferred because the surface layer shows additionally high adhesiveness for the silicone rubber elastic layer. As described above, a molecule having high mobility destabilizes such interface to reduce the adhesiveness. When R2 in the structural formula (1) and R4 in the structural formula (2) represent hydrogen atoms, the degree of freedom of movement of a copolymer molecule can be minimized. Accordingly, the adhesiveness between the surface layer and the silicone rubber elastic layer may be improved.

A known polymerization method can be employed in the production of the copolymer according to the present invention. Specifically, for example, a bulk polymerization method, a solution polymerization method, an emulsion polymerization method, or a suspension polymerization method can be employed. Of those, a solution polymerization method is preferred because the reaction can be easily controlled. The following solvents can be given as examples of a solvent to be used in solution polymerization: xylene, toluene, ethyl acetate, isobutyl acetate, isopropyl alcohol, methanol, ethanol, methyl ethyl ketone, methyl isobutyl ketone, N,N-dimethylformamide, dimethylformamide, and the like.

The following polymerization initiators can be given as examples of a polymerization initiator to be used in the production of the copolymer according to the present invention: t-butyl peroxy-2-ethylhexanoate, cumyl perpivalate, t-butyl peroxy laurate, benzoyl peroxide, lauroyl peroxide, octanoyl peroxide, di-t-butyl peroxide, t-butyl cumyl peroxide, dicumyl peroxide, 2,2'-azobisisobutyronitrile, 2,2'-azobis(2-methylbutyronitrile), 2,2'-azobis(2,4-dimethylvaleronitrile), 2,2'-azobis(4-methoxy-2,4-dimethylvaleronitrile), dimethyl 2,2'-azobis(2-methylpropionate), and the like. One kind of those may be used alone or two or more kinds thereof may be used in combination.

In the copolymer according to the present invention, the component represented by the structural formula (1) can be formed by the polymerization method using a (meth) acrylic acid monomer which contains a quaternary ammonium group. Specific examples of the monomer for forming such structure can include bromides, chlorides, or p-toluenesulfonates of a dimethyldecylaminoethyl (meth)acrylate cation, a dimethylundecylaminoethyl (meth)acrylate cation, a dimethyldodecylaminoethyl (meth)acrylate cation, a dimethyltridecylaminoethyl (meth)acrylate cation, a dimethyltetradecylaminoethyl (meth)acrylate cation, a dimethylpentadecylaminoethyl (meth)acrylate cation, a dimethylhexadecylaminoethyl (meth)acrylate cation, a dimethylhexadecylaminomethyl (meth)acrylate cation, a dimethylhexadecylaminobutyl (meth)acrylate cation, a dimethylheptadecylaminoethyl (meth)acrylate cation, and a dimethyloctadecylaminoethyl (meth)acrylate cation. It should be noted that, in the present invention, the term "(meth)acrylate" means acrylate or methacrylate.

In the copolymer according to the present invention, the component represented by the structural formula (2) can be formed by the polymerization method using a (meth) acrylic acid monomer which contains a dimethylamino group. Specific examples of the monomer for forming such structure can include dimethylaminomethyl (meth)acrylate, dimethylaminoethyl (meth)acrylate, dimethylaminopropyl (meth)acrylate, and dimethylaminobutyl (meth)acrylate.

A copolymerization ratio between those monomers is not particularly limited and can be set as required. The copolymerization ratio can be set by adjusting the loading amount of each monomer to be used in the reaction in the polymerization method. That is, when the charge-providing performance needs to be additionally improved, the blending amount of the quaternary ammonium group-containing monomer for forming the structural unit represented by the structural formula (1) has only to be increased so that its copolymerization ratio may be increased. In addition, when the peeling of the surface layer needs to be additionally suppressed, the loading amount of the dimethylamino group-containing monomer for forming the structural unit represented by the structural formula (2) has only to be increased so that its copolymerization ratio may be increased. When the abundance of the structural unit represented by the structural formula (1) in the copolymer is represented by A mol % and the abundance of the structural unit represented by the structural formula (2) in the copolymer is represented by B mol %, a value of A/B is preferably 1.0 or more and 5.0 or less. When the copolymerization ratio falls within the range, a particularly good balance is established between the charge-providing performance and the suppression of the peeling of the surface layer.

The copolymer according to the present invention may contain, as a component, a structural unit except the structural unit represented by the structural formula (1) and the structural unit represented by the structural formula (2). The structural unit is specifically, for example, a structural unit formed by the polymerization of a (meth) acrylic acid alkyl ester. A monomer for forming such structural unit is, for example, methyl (meth) acrylate, ethyl (meth)acrylate, or butyl (meth) acrylate. Of those, methyl methacrylate is preferred because of the following reason. As the alkyl chain length of its substituent is short and hence its degree of freedom of movement is low, methyl methacrylate does not impair the adhesiveness between the surface layer and the elastic layer.

The copolymer preferably has a weight-average molecular weight (Mw) of 10,000 or more and 100,000 or less. When the Mw is 10,000 or more, the film formability of the surface layer is excellent. When the Mw is 100,000 or less, the flexibility of the surface layer to be formed is excellent.

The surface layer contains the binder resin for imparting a required strength to the surface of the developing roller in addition to the copolymer. Examples of the binder resin to be used for the surface layer include a polyurethane resin, a polyester resin, a polyether resin, an acrylic resin, an epoxy resin, a phenol resin, and an amino resin such as a melamine resin. Of those, a polyurethane resin is preferred because it is excellent in charge-providing performance for a developer. As the polyurethane resin has moderate polarity, the orientation of the structural unit represented by the structural formula (1) of the copolymer toward the vicinity of the outermost surface of the developing roller is promoted by a polarity difference. As a result, the charge-providing performance of the copolymer may significantly appear. The polyurethane resin is obtained by a reaction between known polyol and isocyanate compound. For example, a polyether polyurethane can be obtained by causing a polyether polyol and an isocyanate compound to react with each other, and a polyester polyurethane can be obtained by causing a polyester polyol and an isocyanate compound to react with each other.

The content of the copolymer having the structural unit represented by the structural formula (1) and the structural unit represented by the structural formula (2) according to the present invention is preferably 0.2 part by mass or more and 20 parts by mass or less with respect to 100 parts by mass of the solid content of the binder resin in the surface layer. When the content is 0.2 part by mass or more, the charge-providing effect is excellent. When the content is 20 parts by mass or less, the film formability of the surface layer is excellent.

Conducting fine particles can be incorporated into the surface layer of the developer carrying member according to the present invention.

Examples of the conducting fine particles can include conducting powders such as: a conducting carbon black such as acetylene black; a carbon black for rubber such as SAF, ISAF, HAF, FEF, GPF, SRF, FT, or MT; a carbon black for color (ink) subjected to an oxidation treatment or the like; and a metal and a metal oxide such as copper, silver, or germanium. Of those, carbon black is preferred because the conductivity of the surface layer can be controlled with a small amount thereof. The carbon black is preferably carbon black having a primary particle diameter of 18 nm or more and 25 nm or less, and a dibutyl phthalate (DBP) oil absorption of 50 ml/100 g or more and 160 ml/100 g or less because a balance between its conductivity and dispersibility is good. The content of the conducting fine particles is preferably 10 parts by mass or more and 30 parts by mass or less with respect to 100 parts by mass of the solid content of the resin forming the surface layer.

When the surface of the developer carrying member is provided with predetermined roughness, fine particles for controlling the roughness can be added to the surface layer.

The fine particles for controlling the roughness preferably have a volume-average particle diameter of 3 to 20 μm. In addition, the addition amount of the fine particles for controlling the roughness to be added to the surface layer is preferably 1 to 50 parts by mass with respect to 100 parts by mass of the solid content of the resin of the surface layer. Fine particles of, for example, a polyurethane resin, a polyether resin, a polyamide resin, an acrylic resin, or a polycarbonate resin can be used as the fine particles for controlling the roughness.

Although a method of forming the surface layer is not particularly limited, the layer can be formed by, for example, dispersing and mixing the respective components of the surface layer in a solvent to prepare a paint, applying the paint onto the mandrel or the elastic layer, and drying the applied paint to solidify the paint or curing the paint. A known dispersing apparatus utilizing beads such as a sand mill, a paint shaker, a Dyno-mill, or a pearl mill can be suitably utilized in the dispersion and mixing. In addition, a known method such as a dipping method, a spray method, or a roll coating method is applicable to a method of applying the resultant paint to the mandrel or the elastic layer.

An electrophotographic process cartridge and an electrophotographic image forming apparatus according to the present invention are not limited to a copying machine, a facsimile, or a printer as long as the cartridge and the apparatus each have the developing roller of the present invention. The electrophotographic process cartridge is detachably mountable to the main body of the electrophotographic image forming apparatus. A printer according to a non-magnetic, one-component development mode is described below as an example of the electrophotographic process cartridge and electrophotographic image forming apparatus of the present invention each mounted with the developing roller of the present invention.

Figure 2:
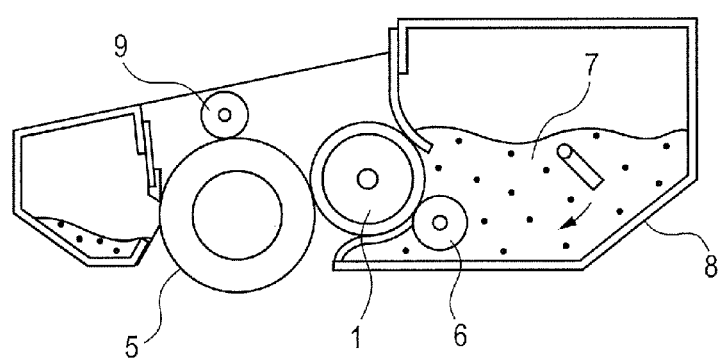
FIG. 2 is a schematic construction view illustrating an example of an electrophotographic process cartridge according to the present invention.

In the electrophotographic process cartridge illustrated in FIG. 2, a developing apparatus 8 includes a developer container storing a non-magnetic developer 7 as a one-component developer, and a developing roller 1 that is positioned at an opening portion extending in a longitudinal direction in the developer container and is placed so as to be opposite to a photosensitive member 5. The developing apparatus 8 develops an electrostatic latent image on the photosensitive member 5 to form an electrophotographic image. The surface of the developing roller 1 placed in contact with the photosensitive member 5 is supplied with the developer 7 in the developing apparatus 8 by a developer-supplying roller 6.

Figure 3:
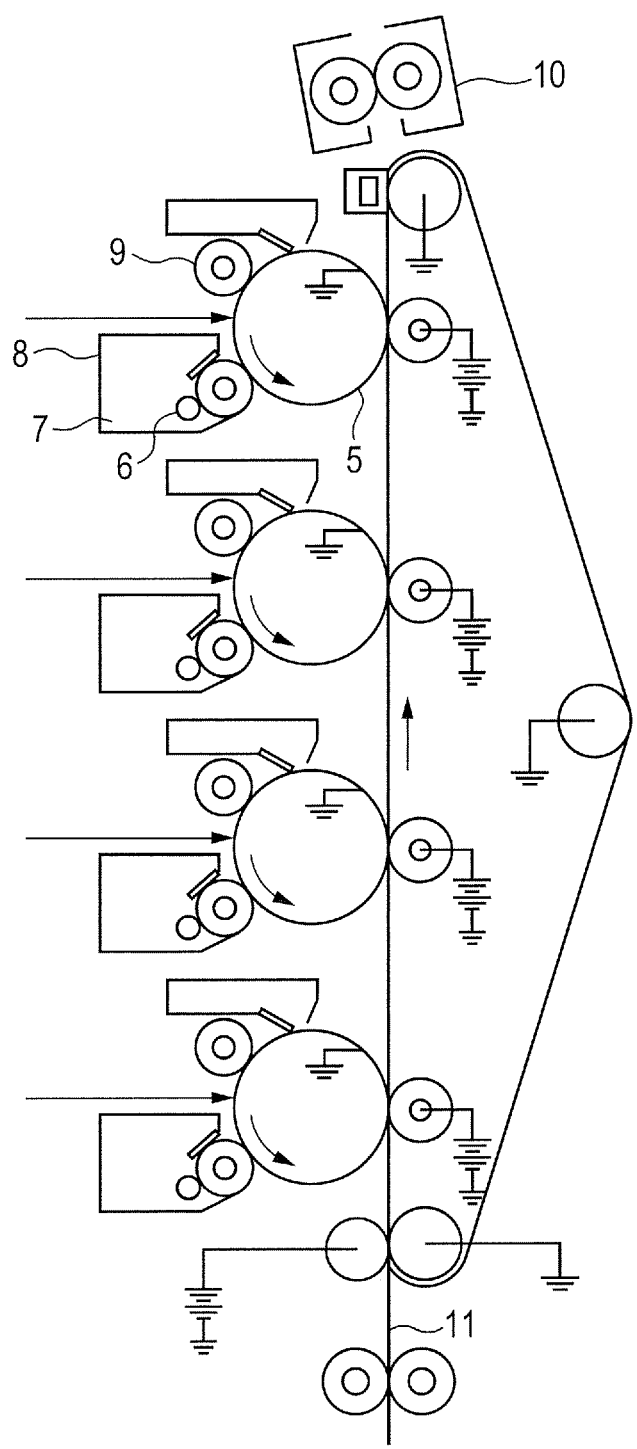
FIG. 3 is a schematic construction view illustrating an example of an electrophotographic image forming apparatus according to the present invention.

As illustrated in FIG. 3, the photosensitive member 5 rotated by a rotating mechanism (not shown) is placed in the printer. Further, a charging member 9 for charging the surface of the photosensitive member to predetermined polarity and a predetermined potential is placed around the photosensitive member. Further, an image exposing apparatus (not shown) is placed for the purpose of subjecting the charged surface of the photosensitive member to image exposure to form an electrostatic latent image. Further, the developing apparatus 8 having the developing roller 1 of the present invention for causing the developer to attach to the formed electrostatic latent image to develop the image is placed around the photosensitive member. Placed on a conveying path for paper 11 is a fixing apparatus 10 for fixing a transferred image onto the paper.

Hereinafter, the present invention is specifically described by way of production examples and examples.

(Production Example of Copolymer Solution)

PRODUCTION EXAMPLE 1

The following materials were mixed in a four-necked separable flask provided with a stirring machine, a condenser, a temperature gauge, and a nitrogen-introducing tube, and were then stirred until the system became uniform.

TABLE 1

| Material | Compound name | Part(s) by mass |
|---|---|---|
| Copolymerizable component | Dimethylaminoethyl hexadecyl acrylate bromide salt | 48.5 |
| | Dimethylaminoethyl methacrylate | 5 |
| | Methyl methacrylate | 6 |
| Solvent | Isopropyl alcohol | 100 |
| Polymerization initiator | 2,2'-Azobisisobutyronitrile (hereinafter represented as "AIBN") | 0.6 |

While the stirring was continued, the temperature in the reaction system was increased to 70° C., followed by a reaction in a reflux state for 8 hours while nitrogen was introduced into the flask. Further, the solution was diluted with ethanol. Thus, a copolymer solution A1 having a solid content of 40 mass % was obtained. The resultant copolymer solution was subjected to the measurement of the weight-average molecular weight of its copolymer by the following molecular weight measurement method. As a result, the weight-average molecular weight was 16,000.

(Molecular Weight Measurement)

A device and conditions used in the measurement of the weight-average molecular weight (Mw) are as follows.

Measurement device: HLC-8120GPC (manufactured by TOSOH CORPORATION)
Column: TSKgel SuperHM-M (manufactured by TOSOH CORPORATION)×2
Solvent: THF (containing 20 mM triethylamine)
Temperature: 40° C.
Flow rate of THF: 0.6 ml/min It should be noted that a 0.1-mass % solution prepared by diluting the copolymer solution with THF was used as a measurement sample. Further, the measurement was performed with a refractive index (RI) detector as a detector.

A calibration curve was created with TSK Standard Polystyrenes A-1000, A-2500, A-5000, F-1, F-2, F-4, F-10, F-20, F-40, F-80, and F-128 (manufactured by TOSOH CORPORATION) as standard samples for creating a calibration curve, and then the weight-average molecular weight was determined from the retention time of the measurement sample obtained based on the calibration curve.

PRODUCTION EXAMPLES 2 to 20

Copolymer solutions A2 to A18, and copolymer solutions B1 and B2 were obtained in the same manner as in Production Example 1 except that the copolymerizable components and their blending amounts were changed to conditions shown in Table 2.

In addition, Table 3 shows the structures of copolymers in the copolymer solutions A1 to A18, and the copolymer solutions B1 and B2 obtained by the foregoing procedure.

TABLE 2

| Production Example | Copolymer solution No. | Copolymerizable component 1 | Blending amount (g) | Copolymerizable component 2 | Blending amount (g) | Copolymerizable component 3 | Blending amount (g) |
|---|---|---|---|---|---|---|---|
| 1 | A1 | Dimethylhexadecylaminoethyl acrylate bromide | 48.5 | Dimethylaminoethyl acrylate | 5.0 | Methyl methacrylate | 6.0 |
| 2 | A2 | | 55.4 | | 2.9 | | 6.0 |
| 3 | A3 | | 53.9 | | 3.3 | | 6.0 |
| 4 | A4 | | 32.3 | | 10.0 | | 6.0 |
| 5 | A5 | | 21.6 | | 13.3 | | 6.0 |
| 6 | A6 | Dimethyltetradecylaminoethyl acrylate bromide | 45.6 | | 5.0 | | 6.0 |
| 7 | A7 | Dimethyloctadecylaminoethyl acrylate bromide | 51.4 | | 5.0 | | 6.0 |
| 8 | A8 | Dimethyldecylaminoethyl methacrylate bromide | 41.1 | Dimethylaminoethyl methacrylate | 5.5 | | 6.0 |
| 9 | A9 | Dimethyldodecylaminoethyl methacrylate bromide | 44.1 | | 5.5 | | 6.0 |
| 10 | A10 | Dimethyldodecylaminoethyl methacrylate bromide | 47.0 | | 5.5 | | 6.0 |
| 11 | A11 | Dimethylhexadecylaminoethyl methacrylate bromide | 50.0 | | 5.5 | | 6.0 |
| 12 | A12 | Dimethyloctadecylaminoethyl methacrylate bromide | 52.9 | | 5.5 | | 6.0 |
| 13 | A13 | Dimethylhexadecylaminoethyl methacrylate chloride | 45.3 | | 5.5 | | 6.0 |
| 14 | A14 | Dimethylhexadecylaminoethyl methacrylate p-toluenesulfonate | 59.5 | | 5.5 | | 6.0 |
| 15 | A15 | Dimethylhexadecylaminomethyl methacrylate bromide | 48.5 | | 5.5 | | 6.0 |
| 16 | A16 | Dimethylhexadecylaminobutyl methacrylate bromide | 52.9 | | 5.5 | | 6.0 |
| 17 | A17 | Dimethylhexadecylaminoethyl methacrylate bromide | 50.0 | Dimethylaminomethyl methacrylate | 5.0 | | 6.0 |
| 18 | A18 | Dimethylhexadecylaminoethyl methacrylate bromide | 50.0 | Dimethylaminobutyl methacrylate | 6.5 | | 6.0 |
| 19 | B1 | Dimethylhexadecylaminoethyl methacrylate bromide | 64.7 | — | — | Methyl methacrylate | 6.0 |
| 20 | B2 | — | — | Dimethylaminoethyl methacrylate | 40.0 | | 12.0 |

TABLE 3

| Production Example | Copolymer solution No. | Copolymerizable component 1 Structural unit represented by structural formula (1) | | | | Blending amount (Mol %) | Copolymerizable component 2 Structural unit represented by structural formula (2) | | Blending amount (Mol %) | Copolymerizable component 3 Blending amount (Mol %) | Weight-average molecular weight (Mw) |
|---|---|---|---|---|---|---|---|---|---|---|---|
| | | R1 | R2 | R3 | X | | R4 | R5 | | | |
| 1 | A1 | 16 | H | 2 | Br | 52.5 | H | 2 | 17.5 | 30 | 16,000 |
| 2 | A2 | 16 | H | 2 | Br | 60.0 | H | 2 | 10.0 | 30 | 18,000 |
| 3 | A3 | 16 | H | 2 | Br | 58.3 | H | 2 | 11.7 | 30 | 18,000 |
| 4 | A4 | 16 | H | 2 | Br | 35.0 | H | 2 | 35.0 | 30 | 14,000 |
| 5 | A5 | 16 | H | 2 | Br | 23.3 | H | 2 | 46.7 | 30 | 12,000 |
| 6 | A6 | 14 | H | 2 | Br | 52.5 | H | 2 | 17.5 | 30 | 16,000 |
| 7 | A7 | 18 | H | 2 | Br | 52.5 | H | 2 | 17.5 | 30 | 18,000 |
| 8 | A8 | 10 | 1 | 2 | Br | 52.5 | 1 | 2 | 17.5 | 30 | 15,000 |
| 9 | A9 | 12 | 1 | 2 | Br | 52.5 | 1 | 2 | 17.5 | 30 | 16,000 |
| 10 | A10 | 14 | 1 | 2 | Br | 52.5 | 1 | 2 | 17.5 | 30 | 17,000 |
| 11 | A11 | 16 | 1 | 2 | Br | 52.5 | 1 | 2 | 17.5 | 30 | 17,000 |
| 12 | A12 | 18 | 1 | 2 | Br | 52.5 | 1 | 2 | 17.5 | 30 | 18,000 |
| 13 | A13 | 16 | 1 | 2 | Cl | 52.5 | 1 | 2 | 17.5 | 30 | 16,000 |
| 14 | A14 | 16 | 1 | 2 | p-TSA | 52.5 | 1 | 2 | 17.5 | 30 | 19,000 |
| 15 | A15 | 16 | 1 | 1 | Br | 52.5 | 1 | 2 | 17.5 | 30 | 17,000 |
| 16 | A16 | 16 | 1 | 4 | Br | 52.5 | 1 | 2 | 17.5 | 30 | 18,000 |
| 17 | A17 | 16 | 1 | 2 | Br | 52.5 | 1 | 1 | 17.5 | 30 | 17,000 |
| 18 | A18 | 16 | 1 | 2 | Br | 52.5 | 1 | 4 | 17.5 | 30 | 18,000 |

TABLE 3-continued

| Production Example | Copolymer solution No. | Copolymerizable component 1 Structural unit represented by structural formula (1) | | | | Blending amount (Mol %) | Copolymerizable component 2 Structural unit represented by structural formula (2) | | Blending amount (Mol %) | Copolymerizable component 3 Blending amount (Mol %) | Weight-average molecular weight (Mw) |
|---|---|---|---|---|---|---|---|---|---|---|---|
| | | R1 | R2 | R3 | X | | R4 | R5 | | | |
| 19 | B1 | 16 | H | 2 | Br | 70.0 | — | — | — | 30 | 19,000 |
| 20 | B2 | — | — | — | — | — | H | 2 | 70.0 | 30 | 15,000 |

Numerical values shown in R1, R2, and R4 in the table each represent the number of carbon atoms of a linear alkyl group.
Numerical values shown in R3 and R5 in the table each represent the number of carbon atoms of an alkylene group.
p-TSA in the table represents a p-toluenesulfonic acid ion.

EXAMPLE 1

1. <Production of Mandrel>

A product obtained by applying and baking a primer (trade name: DY35-051; manufactured by Dow Corning Toray Co., Ltd.) to a cored bar made of SUS304 having a diameter of 6 mm was prepared as a mandrel.

2. <Production of Elastic Layer>

Next, the mandrel was placed in a die and then an addition-type silicone rubber composition obtained by mixing materials shown in Table 4 below was injected into a cavity in the die.

TABLE 4

| Material | Part(s) by mass |
|---|---|
| Liquid silicone rubber material (trade name: SE6724A/B; manufactured by Dow Corning Toray Co., Ltd.) | 100 |
| Carbon black (trade name: TOKABLACK #7360SB; manufactured by TOKAI CARBON CO., LTD.) | 35 |
| Silica powder | 0.2 |
| Platinum catalyst | 0.1 |

Subsequently, the die was heated to subject the silicone rubber to vulcanization curing at 150° C. for 15 minutes, followed by removal the resultant from the die. After that, heating was performed at 180° C. for an additional one hour to complete the curing reaction. Thus, an elastic layer having a thickness of 3 mm was provided on the outer periphery of the mandrel.

3. <Production of Surface Layer>

100.0 Parts by mass of a polyether polyol (trade name: PTG 2000, manufactured by HODOGAYA CHEMICAL CO., LTD.) and 124.9 parts by mass of an MDI-based polyisocyanate (trade name: CORONATE 2521, manufactured by Nippon Polyurethane Industry Co., Ltd.) as binder resin materials for a surface layer were mixed. Further, 36.0 parts by mass of carbon black (trade name: MA 230, manufactured by Mitsubishi Chemical Corporation) as conducting fine particles were added to the mixture, followed by stirring and mixing. After that, methyl ethyl ketone was added to and mixed in the resultant mixture so that the total solid content ratio was 30 mass %, and the mixture was then uniformly dispersed with a sand mill.

11.7 Parts by mass of the copolymer solution A1 were gradually added to the dispersion solution while being stirred with a stirring motor. Further, the contents were mixed and stirred with the stirring motor for 20 minutes. Thus, a paint-1 for forming a surface layer was obtained. Further, the paint for forming a surface layer was diluted with methyl ethyl ketone so that its viscosity was 10 to 13 cps. After that, the paint was applied onto the elastic layer. The applied paint was dried and then subjected to a heating treatment at a temperature of 150° C. for 1 hour to form a surface layer having a thickness of about 20 μm on the outer periphery of the elastic layer. Thus, a developing roller-1 was obtained.

EXAMPLES 2 to 18

Developing rollers-2 to 18 were obtained by the same procedure as that of Example 1 except that the copolymer solution A1 was changed to a copolymer solution shown in Table 5.

EXAMPLE 19

A mandrel was prepared by the same procedure as that of Example 1. Further, an elastic layer was provided thereon.

Next, 100.0 parts by mass of a polyester polyol (trade name: NIPPOLAN 3027, manufactured by Nippon Polyurethane Industry Co., Ltd.) and 102.6 parts by mass of an MDI-based polyisocyanate (trade name: CORONATE 2521, manufactured by Nippon Polyurethane Industry Co., Ltd.) as binder resin materials for a surface layer were mixed. Further, 33.7 parts by mass of carbon black (trade name: MA 230, manufactured by Mitsubishi Chemical Corporation) as conducting fine particles were added to the mixture, followed by stirring and mixing.

After that, methyl ethyl ketone was added to and mixed in the resultant mixture so that the total solid content ratio was 30 mass %, and the mixture was then uniformly dispersed with a sand mill.

Next, paint preparation, viscosity adjustment, dip coating, drying, heating treatment, and the like were performed by exactly the same procedure as that of Example 1 to form a surface layer having a thickness of about 20 μm on the outer periphery of the elastic layer. Thus, a developing roller-19 was obtained.

EXAMPLES 20 to 23

Developing rollers-20 to 23 were obtained by the same procedure as that of Example 19 except that the copolymer solution A1 was changed to a copolymer solution shown in Table 5.

EXAMPLE 24

A mandrel was prepared by the same procedure as that of Example 1. Further, an elastic layer was provided thereon. Next, 30.0 parts by mass of carbon black (trade name: MA 230, manufactured by Mitsubishi Chemical Corporation) as conducting fine particles were added to 200.0 parts by mass of a polyamide resin (trade name: LUCKAMIDE N-153-IM-65, manufactured by DIC Corporation) as a binder resin material for a surface layer, followed by stirring and mixing. After that, methyl ethyl ketone was added to and mixed in the resultant mixture so that the total solid content ratio was 30 mass %, and the mixture was then uniformly dispersed with a sand mill.

A paint was prepared by the same procedure as that of Example 1 except that the amount of the copolymer solution A1 to be added to the dispersion solution was changed to 9.8 parts by mass. Further, viscosity adjustment, dip coating, drying, heating treatment, and the like were performed by exactly the same procedure as that of Example 1 to form a surface layer having a thickness of about 20 μm on the outer periphery of the elastic layer. Thus, a developing roller-24 was obtained.

EXAMPLES 25 to 28

Developing rollers-25 to 28 were obtained by the same procedure as that of Example 24 except that the copolymer solution A1 was changed to a copolymer solution shown in Table 5.

EXAMPLE 29

A mandrel was prepared by the same procedure as that of Example 1. Further, an elastic layer was provided thereon. Next, 27.6 parts by mass of carbon black (trade name: MA 230, manufactured by Mitsubishi Chemical Corporation) as conducting fine particles were added to 200.0 parts by mass of a thermosetting resol-type phenol resin (trade name: J-325, manufactured by DIC Corporation) as a binder resin material for a surface layer, followed by stirring and mixing. After that, isopropyl alcohol was added to and mixed in the resultant mixture so that the total solid content ratio was 30 mass %, and the mixture was then uniformly dispersed with a sand mill.

A paint was prepared by the same procedure as that of Example 1 except that the amount of the copolymer solution A1 to be added to the dispersion solution was changed to 10.5 parts by mass. Further, viscosity adjustment, dip coating, drying, heating treatment, and the like were performed by exactly the same procedure as that of Example 1 to form a surface layer having a thickness of about 20 μm on the outer periphery of the elastic layer. Thus, a developing roller-29 was obtained.

EXAMPLES 30 to 33

Developing rollers-30 to 33 were obtained by the same procedure as that of Example 29 except that the copolymer solution A1 was changed to a copolymer solution shown in Table 5.

COMPARATIVE EXAMPLE 1

A developing roller-34 was obtained by the same procedure as that of Example 1 except that the copolymer solution A1 was not added.

COMPARATIVE EXAMPLE 2

A developing roller-35 was obtained by the same procedure as that of Example 1 except that the copolymer solution A1 was changed to the copolymer solution B1.

COMPARATIVE EXAMPLE 3

A developing roller-36 was obtained by the same procedure as that of Example 1 except that the copolymer solution A1 was changed to the copolymer solution B2.

COMPARATIVE EXAMPLE 4

A developing roller-37 was obtained by the same procedure as that of Example 1 except that 11.7 parts by mass of the copolymer solution A1 were changed to a combination of 5.9 parts by mass of the copolymer solution B1 and 5.9 parts by mass of the copolymer solution B2.

The following evaluations were performed with the developing rollers-1 to 37 of Examples 1 to 33 and Comparative Examples 1 to 4. Table 5 shows the results of the evaluations.

(Evaluation (1): Evaluation for Fogging Under High-Temperature, High-Humidity Environment)

An evaluation for fogging under a high-temperature, high-humidity environment was performed by the following method by mounting the developing roller of each example or each comparative example in a laser printer (trade name: LBP5300; manufactured by Canon Inc.) having such a construction as illustrated in FIG. 3.

Under an environment having a temperature of 40° C. and a relative humidity of 90% RH, the printer was stopped during the output of a white solid image. At this time, a developer attaching onto a photosensitive member was peeled off with a tape and then the reduction amount (%) of the reflectance with respect to a reference was measured with a reflection densitometer (trade name: TC-6DS/A; manufactured by Tokyo Denshoku Co., Ltd.). The resultant value was defined as a fogging value. The evaluation was performed based on such fogging value as described below.

A: Less than 3%
B: 3% or more and less than 5%
C: 5% or more (Evaluation (2): Measurement of Triboelectric Charge Quantity (Q/M) of Developer on Developing Roller)

A Q/M was measured in order to evaluate a charge-providing performance of a developing roller for a developer. Under an environment having a temperature of 40° C. and a relative humidity of 90% RH, the developer carried on the developing roller was sucked and collected with a metal cylindrical tube and a cylindrical filter. At that time, a charge quantity Q accumulated in a capacitor through the metal cylindrical tube and a mass M of the sucked developer were measured.

The charge quantity Q/M (μC/g) per unit mass was calculated from those values. When a negatively chargeable developer is used, the sign of the Q/M is negative. It can be said that the charge-providing performance of the developing roller becomes higher as the absolute value of the Q/M increases.

(Evaluation (3): Evaluation for Peeling of Surface Layer Under High-Temperature Severe Environment)

The developing roller obtained in each example or each comparative example was left to stand under an environment having a temperature of 40° C. and a relative humidity of 90% RH for 60 days. After that, the roller was left to stand under room temperature (20° C.) for 3 hours, and then cuts of 10 mm in a circumferential direction and 50 mm in a longitudinal axial direction was provided for the surface layer at each of both end portions of the roller. The roller was horizontally fixed and then the surface layer was pulled from the side of each end portion of the roller in a vertical direction at a rate of 10 mm/min to be forcedly peeled. A load at that time was measured with a load cell. The measurement was performed a total of three times at each of both end portions of the roller and an average for n=6 was defined as a peel strength.

Next, the peeled surface was observed. The adhesiveness of the surface layer for the silicone rubber elastic layer was evaluated by the following criteria except for a broken portion (cohesive failure) inside the elastic layer or the surface layer.
A: No peeling is observed at an interface between the surface layer and the elastic layer.
B: Peeling is observed at the interface between the surface layer and the elastic layer in a range of 20% or less in the peeled surface, but is at such a level that no problems arise in use.
C: Peeling is observed at the interface between the surface layer and the elastic layer in a large part, or the entirety, of the peeled surface.

ranks concerning the peeling of the surface layer become higher in association with the foregoing. That is, the developing rollers of Examples 1 to 33 each achieve compatibility between the charge-providing performance and the suppression of the peeling of the surface layer.

It can be said that out of Examples 1 to 18 each using a polyether polyurethane as a binder, Examples 1 to 7 and Examples 10 to 18 each containing such a copolymer that R1 in the structural formula (1) is constituted of an alkyl group having 14 or more and 18 or less carbon atoms each have a particularly large absolute value of the Q/M and hence each have high charge-providing performance. In addition, it can be said that Examples 1 to 7 in each of which R2 and R4 in the structural formula (1) and the structural formula (2) each represent a hydrogen atom each have a particularly large peel

TABLE 5

|   |   | Copolymer solution No. | Binder resin | Developing roller No. | Evaluation (1) Evaluation for fogging | Evaluation (2) Q/M (μC/g) | Evaluation (3) Peel strength (N) | Evaluation (3) Evaluation for adhesiveness |
|---|---|---|---|---|---|---|---|---|
| Example | 1 | A1 | Polyether polyurethane | 1 | A | −51.1 | 2.59 | A |
|  | 2 | A2 |  | 2 | A | −53.1 | 2.45 | A |
|  | 3 | A3 |  | 3 | A | −51.9 | 2.49 | A |
|  | 4 | A4 |  | 4 | A | −49.3 | 2.63 | A |
|  | 5 | A5 |  | 5 | A | −48.5 | 2.69 | A |
|  | 6 | A6 |  | 6 | A | −49.2 | 2.66 | A |
|  | 7 | A7 |  | 7 | A | −50.8 | 2.48 | A |
|  | 8 | A8 |  | 8 | A | −44.1 | 2.28 | A |
|  | 9 | A9 |  | 9 | A | −44.8 | 2.25 | A |
|  | 10 | A10 |  | 10 | A | −48.2 | 2.22 | A |
|  | 11 | A11 |  | 11 | A | −49.9 | 2.21 | A |
|  | 12 | A12 |  | 12 | A | −51.0 | 2.20 | A |
|  | 13 | A13 |  | 13 | A | −50.9 | 2.20 | A |
|  | 14 | A14 |  | 14 | A | −50.6 | 2.22 | A |
|  | 15 | A15 |  | 15 | A | −51.3 | 2.24 | A |
|  | 16 | A16 |  | 16 | A | −51.2 | 2.20 | A |
|  | 17 | A17 |  | 17 | A | −50.9 | 2.20 | A |
|  | 18 | A18 |  | 18 | A | −50.7 | 2.17 | A |
|  | 19 | A1 | Polyester polyurethane | 19 | A | −50.1 | 2.62 | A |
|  | 20 | A6 |  | 20 | A | −49.1 | 2.72 | A |
|  | 21 | A7 |  | 21 | A | −51.1 | 2.49 | A |
|  | 22 | A8 |  | 22 | A | −44.0 | 2.26 | A |
|  | 23 | A11 |  | 23 | A | −49.7 | 2.21 | A |
|  | 24 | A1 | Polyamide resin | 24 | A | −46.4 | 2.58 | A |
|  | 25 | A6 |  | 25 | A | −46.2 | 2.73 | A |
|  | 26 | A7 |  | 26 | A | −47.1 | 2.49 | A |
|  | 27 | A8 |  | 27 | A | −43.0 | 2.25 | A |
|  | 28 | A11 |  | 28 | A | −48.0 | 2.20 | A |
|  | 29 | A1 | Phenol resin | 29 | A | −46.3 | 2.59 | A |
|  | 30 | A6 |  | 30 | A | −46.3 | 2.69 | A |
|  | 31 | A7 |  | 31 | A | −47.3 | 2.49 | A |
|  | 32 | A8 |  | 32 | A | −43.1 | 2.24 | A |
|  | 33 | A11 |  | 33 | A | −47.9 | 2.22 | A |
| Comparative Example | 1 | None | Polyether polyurethane | 34 | C | −30.3 | 1.33 | B |
|  | 2 | B1 |  | 35 | A | −42.1 | 0.76 | C |
|  | 3 | B2 |  | 36 | C | −32.1 | 2.67 | A |
|  | 4 | B1 and B2 were used in combination |  | 37 | B | −32.3 | 1.50 | B |

It can be said from the results of Table 5 that when the developing rollers of Examples 1 to 33 each containing a copolymer having both a structural unit represented by the structural formula (1) and a structural unit represented by the structural formula (2) are used, each of these developing rollers has a large absolute value of the Q/M in the high-temperature, high-humidity environment, and hence has high charge-providing performance. In addition, their ranks concerning fogging are good in association with the foregoing. In addition, the developing rollers of Examples 1 to 33 each have a large peel strength even after long-term standing under the high-temperature, high-humidity environment, and their strength, and hence each have high adhesiveness between the surface layer and the elastic layer. The same tendency can be observed also in the case where a polyester polyurethane, a polyamide resin, or a phenol resin is used as the binder resin.

In addition, it can be confirmed that in the case where a polyurethane resin is used as the binder resin, the charge-providing performance is better than that in the case where any other binder resin is used.

On the other hand, it can be said that Comparative Example 1 free of the copolymer of the present invention has a small absolute value of the Q/M and hence has low charge-providing performance. Its rank concerning fogging lowers in association with the foregoing.

It can be said that Comparative Example 2 containing a copolymer having a structure represented by the structural formula (1) but free of any structure represented by the structural formula (2) has a higher Q/M than that of Comparative Example 1 and hence has improved charge-providing performance. In addition, its rank concerning fogging is good in association with the foregoing. However, the peel strength of Comparative Example 2 is remarkably low and its rank concerning the peeling of the surface layer is bad in association with the foregoing.

In addition, Comparative Example 3 containing a copolymer having a structure represented by the structural formula (2) but free of any structure represented by the structural formula (1) has a larger peel strength than that of Comparative Example 1 and its rank concerning the peeling of the surface layer becomes higher in association with the foregoing. It can be said, however, that the absolute value of the Q/M in Comparative Example 3 is small and hence its charge-providing performance is low. In addition, its rank concerning fogging lowers in association with the foregoing.

Comparative Example 4 containing a copolymer having a structure represented by the structural formula (1) but free of any structure represented by the structural formula (2), and a copolymer having a structure represented by the structural formula (2) but free of any structure represented by the structural formula (1) has a Q/M comparable to that of Comparative Example 1, though the lowering of its rank concerning the peeling of the surface layer as compared with that of Comparative Example 1 is not observed. Therefore, it can be said that its charge-providing performance is not improved.

It can be said from the foregoing that none of Comparative Examples 1 to 4 achieves compatibility between the charge-providing performance and the suppression of the peeling of the surface layer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-144245, filed Jun. 29, 2011, which is hereby incorporated by reference herein in its entirety.

What is claimed is:

1. A developer carrying member, comprising:
   a mandrel;
   an elastic layer including a silicone rubber; and
   a surface layer covering a peripheral surface of the elastic layer,
   wherein the surface layer comprises:
      a binder resin, and
      a copolymer having a structural unit represented by the following structural formula (1) and a structural unit represented by the following structural formula (2):

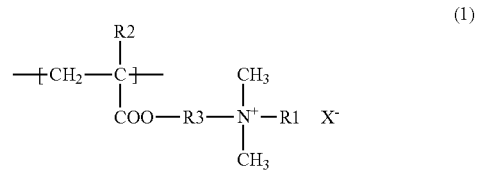

where R1 represents an alkyl group having 10 to 18 carbon atoms, R2 represents one of a methyl group and a hydrogen atom, R3 represents an alkylene group having 1 to 4 carbon atoms, and X⁻ represents one of a chloride ion, a bromide ion, and a p-toluenesulfonic acid ion; and

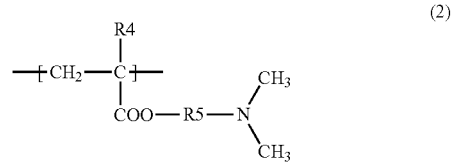

where R4 represents one of a methyl group and a hydrogen atom and R5 represents an alkylene group having 1 to 4 carbon atoms.

2. The developer carrying member according to claim 1, wherein R1 in the structural formula (1) represents an alkyl group having 14 to 18 carbon atoms.

3. The developer carrying member according to claim 1, wherein R2 in the structural formula (1) represents a hydrogen atom and R4 in the structural formula (2) represents a hydrogen atom.

4. The developer carrying member according to claim 1, wherein when an abundance of the structural unit represented by the structural formula (1) in the copolymer is represented by A mol % and an abundance of the structural unit represented by the structural formula (2) in the copolymer is represented by B mol %, a value of A/B is 1.0 or more and 5.0 or less.

5. The developer carrying member according to claim 1, wherein the copolymer has a weight-average molecular weight Mw of 10,000 or more and 100,000 or less.

6. The developer carrying member according to claim 1, wherein the binder resin comprises a polyurethane resin.

7. The developer carrying member according to claim 6, wherein the polyurethane resin comprises a polyester polyurethane.

8. The developer carrying member according to claim 1, wherein the surface layer contains conducting fine particles.

9. The developer carrying member according to claim 8, wherein a content of the conducting fine particles in the surface layer is 10 parts by mass or more and 30 parts by mass or less with respect to 100 parts by mass of a solid content of a resin forming the surface layer.

10. The developer carrying member according to claim 1, wherein the developer carrying member comprises a developing roller.

11. An electrophotographic process cartridge, comprising the developer carrying member according to claim 1, wherein the electrophotographic process cartridge is detachably mountable to a main body of an electrophotographic image forming apparatus.

12. An electrophotographic image forming apparatus, comprising the developer carrying member according to claim 1.

* * * * *